(12) United States Patent
Iwai

(10) Patent No.: US 8,284,427 B2
(45) Date of Patent: Oct. 9, 2012

(54) CLIENT COMMUNICATING WITH A SERVER THROUGH AN IMAGE FORMING APPARATUS

(75) Inventor: Toshimichi Iwai, Kitakatsuragi-gun (JP)

(73) Assignee: Konica Minolta Business Technologies, Inc., Chiyoda, Tokyo (JP)

( * ) Notice: Subject to any disclaimer, the term of this patent is extended or adjusted under 35 U.S.C. 154(b) by 1364 days.

(21) Appl. No.: 11/984,204

(22) Filed: Nov. 14, 2007

(65) Prior Publication Data

US 2008/0192287 A1 Aug. 14, 2008

(30) Foreign Application Priority Data

Feb. 9, 2007 (JP) .................................. 2007-30509

(51) Int. Cl.
*G06F 3/12* (2006.01)
(52) U.S. Cl. ..................................................... 358/1.15
(58) Field of Classification Search .................. 358/1.15
See application file for complete search history.

(56) References Cited

U.S. PATENT DOCUMENTS

| 7,770,022 | B2 * | 8/2010 | Ferlitsch et al. ............... | 713/189 |
|---|---|---|---|---|
| 2002/0118386 | A1 * | 8/2002 | Sakai ............................ | 358/1.15 |
| 2005/0024677 | A1 * | 2/2005 | Miura et al. ................... | 358/1.15 |
| 2005/0105129 | A1 * | 5/2005 | Takahashi ..................... | 358/1.15 |
| 2005/0243363 | A1 * | 11/2005 | Muto ............................ | 358/1.15 |
| 2006/0055968 | A1 * | 3/2006 | Sato et al. ..................... | 358/1.15 |
| 2006/0268323 | A1 * | 11/2006 | Hashimoto .................... | 358/1.15 |
| 2007/0013945 | A1 | 1/2007 | Yoshida et al. | |
| 2007/0061396 | A1 * | 3/2007 | Morris ........................... | 709/203 |
| 2007/0211279 | A1 * | 9/2007 | Podl et al. ..................... | 358/1.15 |

FOREIGN PATENT DOCUMENTS

| JP | 2003-280828 A | 10/2003 |
|---|---|---|
| JP | 2004-086731 A | 3/2004 |
| JP | 2005-129976 A | 5/2005 |
| JP | 2006-135496 | 5/2006 |
| JP | 2007-021777 | 2/2007 |

OTHER PUBLICATIONS

Notification of Reason for Rejection in JP 2007-030509 dated Feb. 24, 2009, and an English Translation thereof.

\* cited by examiner

*Primary Examiner* — Benny Q Tieu
*Assistant Examiner* — Eric A Rust
(74) *Attorney, Agent, or Firm* — Buchanan Ingersoll & Rooney PC

(57) ABSTRACT

In an image processing apparatus which is connected to a server and permitted to make an access request to the server, the server receiving the access request only from a request source which is permitted to make the access request, a reader reads an image to obtain an image file, a transmitter accesses the server and transmits the image file to the server to save the image file in the server, a notifier notifies a specified destination that a file operation request for the image file saved in the server is to be received by the image processing apparatus, and a file operating part accesses the server and performs a requested file operation on one of the image file saved in the server and the image file obtained as a result of accessing the server, when the file operation request based on the notification is received from the specified destination.

16 Claims, 17 Drawing Sheets

| USER NAME | PASSWORD | FUNCTIONAL RESTRICTION |
|---|---|---|
| suzuki | axk135 | NO RESTRICTION |
| tanaka | tkz256 | ONLY BROWSE |
| ⋮ | ⋮ | ⋮ |

| | ACCOUNT NAME | PASSWORD |
|---|---|---|
| SERVER 200 | fs200act | fs200pas |
| ⋮ | ⋮ | ⋮ |

| FILE ID | tf060930-00123 |
|---|---|
| SAVE DESTINATION OF IMAGE FILE (URI) | ftp://192.168.2.200/scan/file00123.pdf |
| ACCOUNT NAME WHEN LOGGING INTO FILE SERVER | fs200act |
| PASSWORD WHEN LOGGING INTO FILE SERVER | fs200pas |
| DECRYPTION KEY OF IMAGE FILE | qazxsw23edcvfr45tgb |
| USER NAME OF USER PERFORMING FILE TRANSMISSION | suzuki |
| PASSWORD OF USER PERFORMING FILE TRANSMISSION | axk135 |
| PERMISSION TIME LIMIT OF FILE OPERATION (DATE, TIME) | 2006.10.07 12:34 |

FIG.7A

EXAMPLE OF REQUEST RECEPTION MAIL  ←1211

To:user01@konicaminolta.jp
From:MFP02@konicaminolta.jp
SUBJECT: FILE TRANSMISSION NOTIFICATION
------------------------------------------

IMAGE FILE (FILE ID 00123) IS TRANSMITTED.
YOU CAN PERFORM FILE OPERATION BY ACCESSING THE FOLLOWING URL.

LIST PAGE OF FILE OPERATION
   http://192.168.0.100/tf060930-00123/ope

BROWSE FILE CONTENT
   http://192.168.0.100/tf060930-00123/view

PRINT FILE CONTENT
   http://192.168.0.100/tf060930-00123/print

DELETE FILE CONTENT
   http://192.168.0.100/tf060930-00123/delete

MAKE PRINT BUTTON OF FILE CONTENT ON PANEL
   http://192.168.0.100/tf060930-00123/button

FIG.7B

To:user01@konicaminolta.jp
From:MFP02@konicaminolta.jp
SUBJECT: FILE TRANSMISSION NOTIFICATION
------------------------------------------

IMAGE FILE (FILE ID 00123) IS TRANSMITTED.
YOU CAN PERFORM FILE OPERATION BY ACCESSING THE FOLLOWING URL.

BROWSE FILE CONTENT
   http://192.168.0.100/tf060930-00123/view

```
LOGIN INFORMATION RECEPTION SCREEN

PLEASE INPUT LOGIN INFORMATION FOR USER
    AUTHENTICATION.

NAME         _____

PASSWORD     _____

[ OK ]    [ CANCEL ]
```

| | SYSTEM | JOB | SCAN |

SCAN TRANSMISSION

TRANSFER FILE OPERATION

FILE OPERATION LIST ftp://192.168.2.200/scan/file00123.pdf

[ BROWSE ]

[ PRINT ]

[ DELETION ]

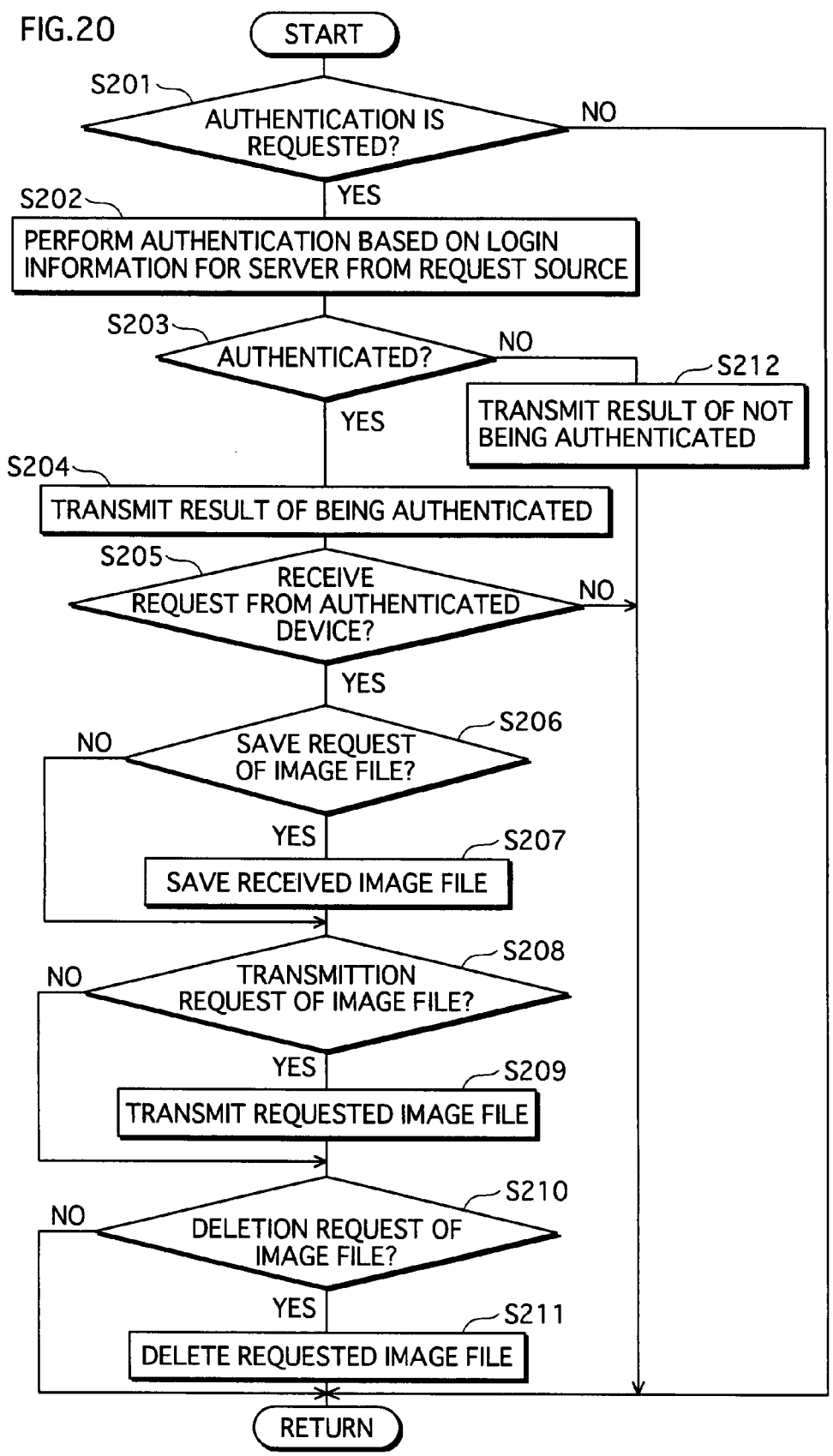

FIG.21

EXAMPLE OF REQUEST RECEPTION MAIL

To:user01@konicaminolta.jp
From:MFP02@konicaminolta.jp
SUBJECT: FILE TRANSMISSION NOTIFICATION
------------------------------------------

IMAGE FILE (FILE ID 00123) IS TRANSMITTED.
YOU CAN PERFORM FILE OPERATION BY ACCESSING THE FOLLOWING URL.

LIST PAGE OF FILE OPERATION
   http://192.168.0.100/tf060930-00123/ope

BROWSE FILE CONTENT
   http://192.168.0.100/tf060930-00123/view

DELETE FILE CONTENT
   http://192.168.0.100/tf060930-00123/delete

MAKE PRINT BUTTON OF FILE CONTENT ON PANEL
   http://192.168.0.100/tf060930-00123/button

CLIENT COMMUNICATING WITH A SERVER THROUGH AN IMAGE FORMING APPARATUS

CROSS REFERENCE TO RELATED APPLICATIONS

This application is based on application NO. 2007-030509 filed in Japan, the contents of which are hereby incorporated by reference.

BACKGROUND OF THE INVENTION (1) Field of the Invention

The present invention relates to an image processing apparatus connected to a server, an image processing system, and an image processing method.

(2) Related Art

As an image processing system in which an image processing apparatus such as a scanner and a copier is connected to a server and a plurality of client terminals via a network, the following system is disclosed in Japanese Published Patent Application No. 2005-129976. In the system, (1) an image processing apparatus reads an original image according to an instruction from a user, transmits an image file which is obtained by reading the original image to a server to have the image file saved in the server, and notifies a client terminal specified by the user that the image file is saved in the server by e-mail. Then, (2) the client terminal which receives the e-mail accesses the server according to an instruction from a user of the client terminal, and as a result, the user can use the image file.

In the server, files of a large number of users using the system are saved. Therefore, in order to ensure security, the system may have a construction in which only a specified user is permitted to access the server.

However, if the number of users who are permitted to access the server is more limited, the number of users who are not permitted to access the server increases. Therefore, in the system, the large number of users cannot use an image file even if client terminals used by the users receive a notification by e-mail, which causes a decrease in convenience.

A user of a notification destination of e-mail can be notified of a password for accessing the server. However, it is preferable to keep information such as a password as confidential as possible because many files of other users are saved in the server.

SUMMARY OF THE INVENTION

An object of the present invention is to provide an image processing apparatus, an image processing system, and an image processing method which enable a user of a client terminal to use an image file stored in a server while ensuring security.

The above object is fulfilled by an image processing apparatus which is connected to a server and permitted to make an access request to the server, the server receiving the access request only from a request source which is permitted to make the access request, the image processing apparatus comprising: a reader operable to read an image to obtain an image file; a transmitter operable to access the server and transmit the image file to the server to save the image file in the server; a notifier operable to notify a specified destination that a file operation request for the image file saved in the server is to be received by the image processing apparatus; and a file operating part operable to, when the file operation request based on the notification is received from the specified destination, access the server and perform a requested file operation on one of the image file saved in the server and the image file obtained as a result of accessing the server.

Here, the "image file" widely includes not only a file of bitmapped image data, but also a file of data indicating an image such as image data which is compressed by a predetermined method, image data which is converted into a predetermined format, and the like.

With the above-stated construction, each of a large number of users using the image processing apparatus can use a storage area in a terminal device of the user effectively by causing a server to save an image file having a large data volume instead of the terminal device of the user. Also, each user can use the image file by requesting a file operation of the image file saved in the server from the terminal device of the user to the image processing apparatus. Moreover, information such as a password for accessing the server is not required to disclose to each user. Therefore, security can be more improved.

The above object is fulfilled by an image processing system in which a server, an image processing apparatus, and a terminal device are connected, the server receiving an access request only from a request source which is permitted to make the access request, the image processing apparatus being permitted to make the access request to the server, and the terminal device being not permitted to access the server, wherein the image processing apparatus comprises: a reader operable to read an image to obtain an image file; a transmitter operable to access the server and transmit the image file to the server to save the image file in the server; a notifier operable to notify the terminal device that a file operation request for the image file saved in the server is to be received by the image processing apparatus; and a file operating part operable to, when the file operation request based on the notification is received from the terminal device, access the server and perform a requested file operation on one of the image file saved in the server and the image file obtained as a result of accessing the server, and the terminal device comprises: a displaying part operable to display the notification; a receiver operable to receive an instruction of requesting the file operation from a user; and a request transmitter operable to, when the instruction is received, transmit the file operation request to the image processing apparatus based on the notification. The above object is fulfilled by an image processing method in an image processing apparatus which is connected to a server and permitted to make an access request to the server, the server receiving the access request only from a request source which is permitted to make the access request, the image processing method comprising: a reading step of reading an image to obtain an image file; a transmitting step of accessing the server and transmitting the image file to the server to save the image file in the server; a notifying step of notifying a specified destination that a file operation request for the image file saved in the server is to be received by the image processing apparatus; and a file operating step of, when the file operation request based on the notification is received from the specified destination, accessing the server and performing a requested file operation on one of the image file saved in the server and the image file obtained as a result of accessing the server.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 3 shows a content example of user information stored in the MFP;

FIG. 4 shows a content example of server information stored in the MFP;

FIG. 5 shows a content example of file information stored in the MFP;

FIG. 7 is a content example of request reception mail;

FIG. 15 shows a display example of a login information reception screen displayed in a display of the terminal device;

FIG. 16 shows a display example of a list screen displayed in the display of the terminal device;

FIG. 20 is a flowchart showing a process performed by the server; and

FIG. 21 is another content example of request reception mail.

DESCRIPTION OF THE PREFERRED EMBODIMENT

The following describes an embodiment of an image processing apparatus and an image processing system of the present invention, with reference to the attached drawings.
<Overall Construction of Image Processing System>

Figure 1:
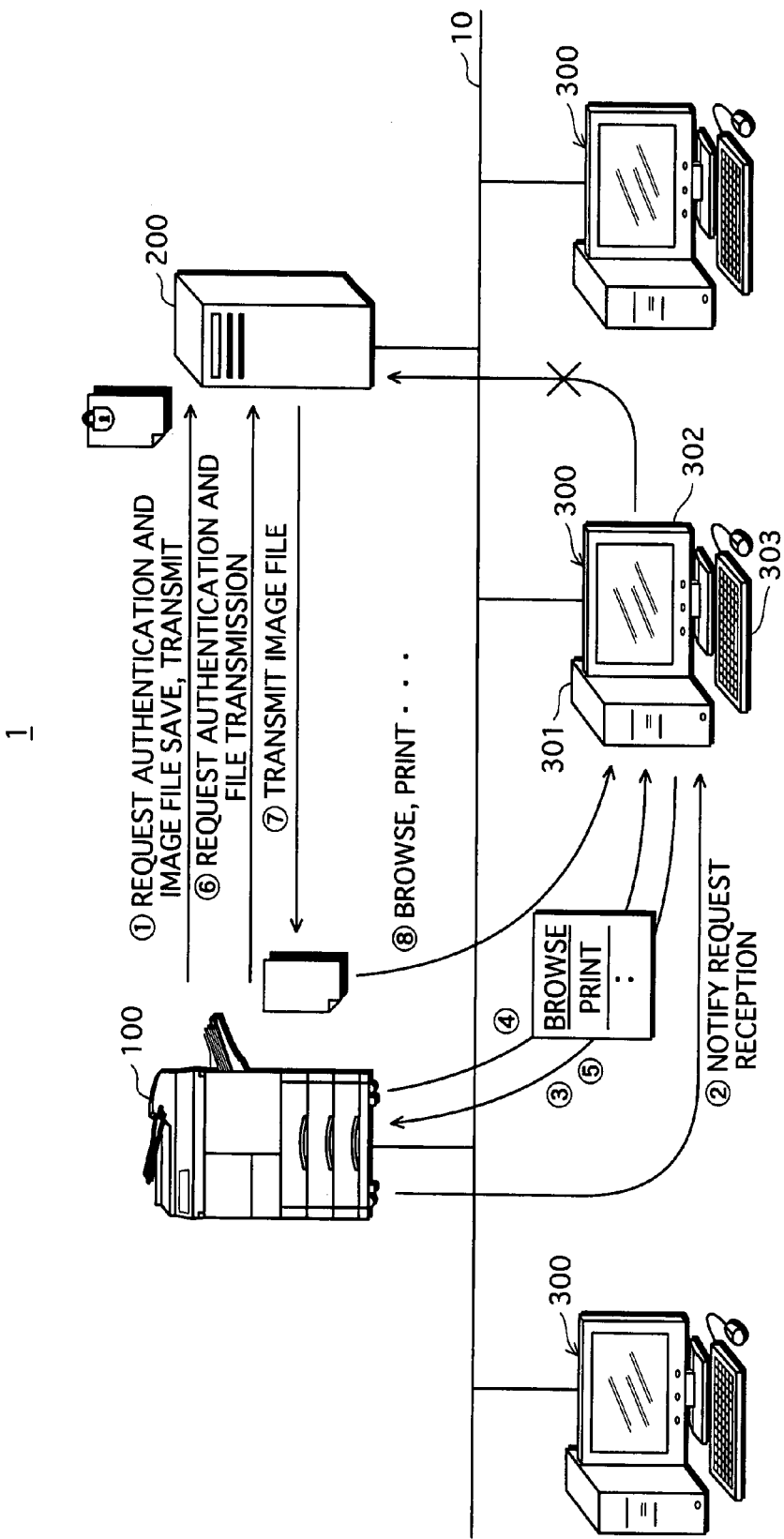
FIG. 1 shows an overall construction of an image processing system including an MFP, a server, and a terminal device.

FIG. 1 shows an overall construction of an image processing system 1 of the embodiment.

As shown in FIG. 1, the image processing system 1 (hereinafter, referred to as "system 1") includes an MFP 100 as an image processing apparatus, a server 200, and a plurality of terminal devices 300, 300 . . . , which are connected via a LAN (Local Area Network) 10 as a network to transfer data with each other.

The MFP 100 is a multifunction digital copier (Multiple Function Peripheral), and performs various jobs such as a scan job for reading a set original image, a copy job for printing an original image based on a read image, and a print job for printing by receiving an execution instruction of printing from an external terminal.

The scan job includes a job for transmitting a read image file to an external device. Specifically, the scan job includes a Scan to FTP (hereinafter, referred to as "file transmission") for transmitting an image file to a FTP server and causing the FTP server to save the image file, a Scan to E-Mail for transmitting an image file by being attached to e-mail (hereinafter, referred to as "mail"), and the like. Note that when an image file is transmitted, data of the image file is not saved in the MFP 100, i.e. the data is deleted in order to make effective use of a storage area in a storing unit such as a RAM included in the MFP 100.

In the MFP 100, a user name and a password for authentication given to each user using the system 1 have been registered in advance. Each user can use the MFP 100 by entering a user name and a password of the user to be authenticated as authorized. This authentication is also performed when a user accesses the MFP 100 from the external terminal 300.

The server 200 is a file server which can store a large number of image files, and receives access only from a request source which is permitted to access, i.e. the MFP 100 in the embodiment. In the server 200, a password for authentication has been registered in advance, and the server 200 permits access only if a password received when accessing is identical to the registered password for authentication. The password is known to only a system administrator, and is not disclosed to a general user. Note that a method for judging whether access is permitted is not limited to the above-mentioned method by using a password.

When receiving file transmission from the MFP 100, the server 200 functions as a FTP server, and saves an image file from the MFP 100. Also, when receiving a transmission request from the MFP 100, the server 200 reads a requested image file, and transmits the read image file to the MFP 100.

The terminal 300 is composed of a personal computer (PC), and includes a PC main body 301, a display 302, a keyboard 303 and the like. Also, application software (hereinafter, referred to as "application") for creating a document and the like is installed in the terminal 300. Therefore, a user can create a file such as document by the application. In addition, a Web browser, a mailer, and a printer driver for causing the MFP 100 to perform a print job are also installed.

Here, an example of a process performed in the system 1 having the above-mentioned construction.

(1) In the MFP 100, file transmission is performed by a user, and an image file is encrypted. After that, the encrypted image file is transmitted to the server 200, and saved in the server 200. At the time, the server 200 authenticates the MFP 100 based on a password from the MFP 100.

(2) The MFP 100 transmits the following request reception mail to a destination specified by a user, i.e. any of the terminal devices 300 (hereinafter, referred to as "terminal device") in the embodiment. The request reception mail indicates that the MFP 100 receives a file operation request for the image file which is saved in the server 200. This request reception mail includes information indicating a file ID of the image file, and a URL of the MFP 100.

A user using the terminal device causes the display 302 to display the request reception mail, and confirms the content of the request reception mail. As a result, the user knows to be able to request the MFP 100 to perform a file operation of the image file which is saved in the server 200. The file operation includes a browse and printing of an image, deletion of a file, and the like. Note that the user cannot obtain the image file from the terminal device because the user does not have an access authority to the server 200 (does not know a password for access).

(3) When a URL (in which a link is provided) indicating the MFP 100 displayed in the request reception mail is clicked by the user, the terminal device transmits a file operation request to the URL (MFP 100).

(4) When receiving the file operation request from the terminal device, the MFP 100 requests the terminal device to transmit login information (a user name and a password) for authenticating the user.

(5) The terminal device transmits the login information entered by the user to the MFP 100.

(6) When authenticating the user as authorized, the MFP 100 requests the server 200 to transmit the image file. At the time, the same authentication performed in the process (1) is also performed.

(7) The image file is transmitted from the server 200 to the MFP 100.

(8) The MFP 100 performs the file operation requested by the user. For example, when the file operation is a browse of an image, the MFP 100 decrypts the encrypted image file. After that, the MFP 100 transmits the decrypted image file to the terminal device, and causes the terminal device to display the decrypted image file in a screen.

With the above-mentioned construction, each of large number of users using the system 1 can use a storage area in a terminal device of the user effectively by transmitting an image file having a large data volume to the server and causing the server to save the image file, instead of the terminal device of the user. Also, each user can use the image file saved in the server by using the same password which is used when using the MFP 100. Moreover, for a system administrator of the system 1, security of a server can be improved because access to a server is restricted to a MFP (a password of a server is not disclosed to a general user).

<Construction of MFP 100>

Figure 2:
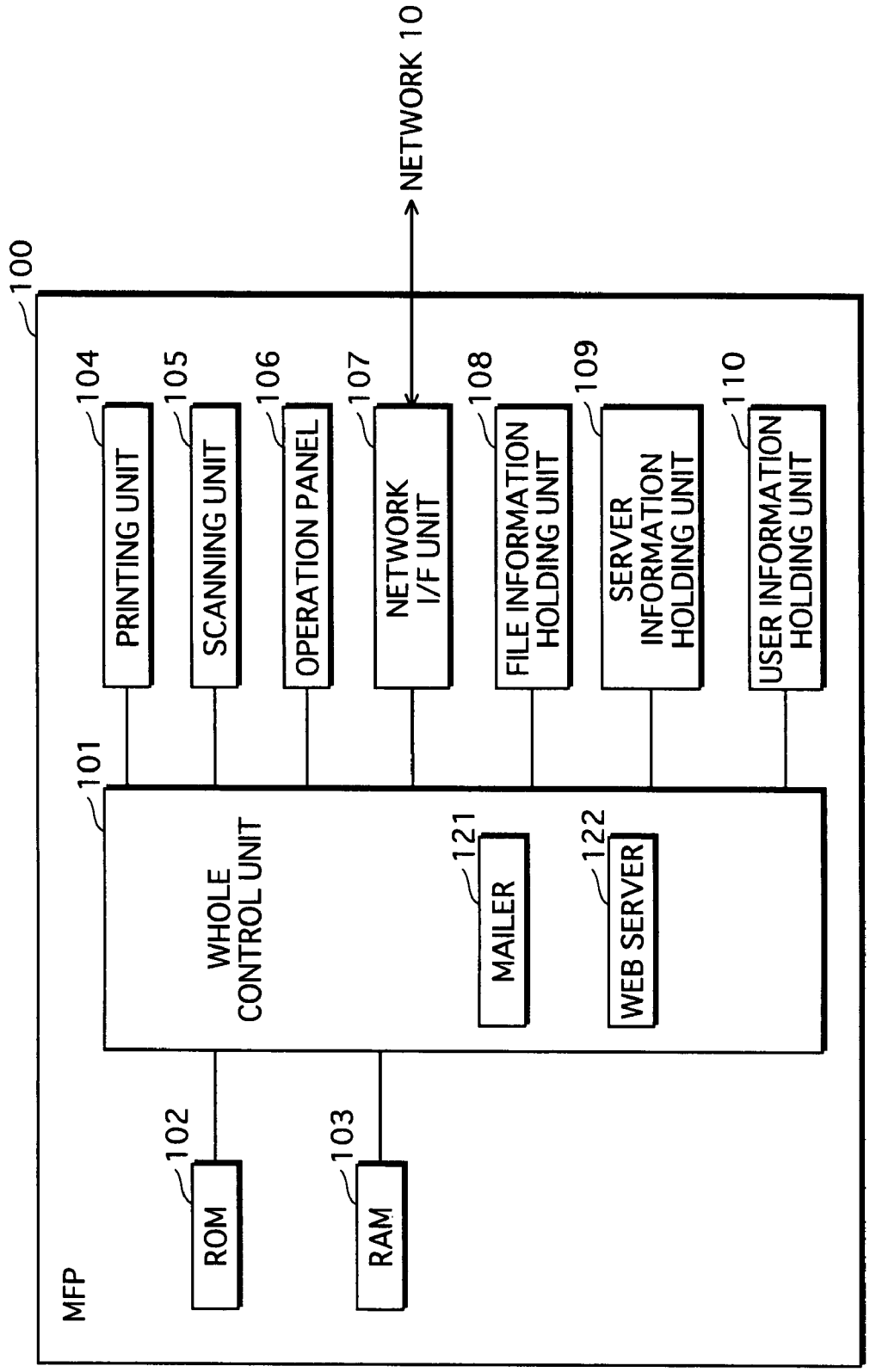
FIG. 2 is a block diagram showing a construction of the MFP.

FIG. 2 is a block diagram showing a construction of the MFP 100.

As shown in FIG. 2, the MFP 100 includes, as main components, a whole control unit 101, a ROM 102, a RAM 103, a printing unit 104, a scanning unit 105, an operation panel 106, a network interface (I/F) unit 107, a file information holding unit 108, a server information holding unit 109, a user information holding unit 110, and the like.

The printing unit 104 is a device for printing an image on a sheet using a publicly-known electrophotographic method and the like. The scanning unit 105 is a publicly-known image reader for reading an original image. The operation panel 106 includes various keys such as a numeric keypad for entering the number of copies by a user, a start key for instructing to start a job such as a copy, a file transmission key for instructing to perform file transmission, and the like. Also, the operation panel 106 includes a liquid crystal display unit on which touch panels are laminated. The operation panel 106 causes the liquid crystal display unit to display a necessary screen based on an instruction from the whole control unit 101, and notifies the whole control unit 101 of received information by receiving a key input or a touch input from a user.

The network interface (I/F) unit 107 is an interface for connecting to a LAN 10 such as a LAN card, and a LAN board.

The user information holding unit 110 is composed of a nonvolatile memory, and holds user information.

FIG. 3 shows a content example of user information 1111.

As shown in FIG. 3, in the user information 1111, pieces of information indicating a user name, a password, and a functional restriction are stored in correspondence with each other. The user name indicates a user name using the system 1, and the password indicates a password for authenticating a user in the MFP 100. The user name and the password are written to (registered in) the user information holding unit 110, by an input operation of each user on the operation panel 106 of the MFP 100. Note that the user name and the password may be registered by a system administrator and the like. Also, the user name and the password may be registered from the terminal device 300 by a remote operation.

The functional restriction is information (restriction information) indicating which file operation is restricted for each user. A user is prohibited to perform a file operation regarding a restricted function. This functional restriction is registered by the system administrator of the system 1, and used when a specified user is permitted to perform a specified operation.

The server information holding unit 109 is composed of a nonvolatile memory, and holds server information 1091 indicating account names and passwords of all servers connected to the LAN 10 as shown in FIG. 4. This server information 1091 can be registered and modified only by an administrator, and cannot be referenced by a general user.

Back to FIG. 2, the file information holding unit 108 is composed of a nonvolatile memory, and holds file information of an image file transmitted to the server 200 by file transmission. This file information is registered by the whole control unit 101 for each transmitted image file.

FIG. 5 shows a content example of file information 1081.

As shown in FIG. 5, in the file information 1081, pieces of information indicating a file ID, a save destination (URI) of a transmitted image file, an account name and a password of a server, a decryption key of a transmitted image file, a user name, a password of a user, and a permission time limit of a file operation are stored in correspondence with each other.

The file ID is identification information which is uniquely assigned for each image file.

The URI of the image file indicates a directory as a save location of the image file of a save destination server, i.e. the server 200.

The account name and the password of the server indicates an account name and a password of a save destination server, and a password corresponding to a specified account name is read from server information 1091 held by the server information holding unit 109.

The decryption key of the image file is used for decrypting an encrypted image file, and generated as a decryption key corresponding to an encryption key which is generated when an image file is encrypted.

The user name and the password indicate a user name and a password of a user who instructs to perform file transmission in the MFP 100.

The permission time limit of the file operation indicates a time limit that permits a file operation of an image file, and is used when a user would like to permit a browse and the like until an indicated time limit. Note that the permission time limit of the file operation is not limited to the time limit, and information regarding a permitted time (time information) such as a specific period may be registered. As described later, the time limit is specified by a user from the operation panel 106. However, a predetermined time limit and the like may be automatically set.

Back to FIG. 2, in the ROM 102, a control program in the whole control unit 101 is stored. The whole control unit 101 includes a CPU and the like, reads a necessary program from the ROM 102, controls operations of the printing unit 104 and the scanning unit 105, and performs a smooth operation of each job such as scanning and copying. The whole control unit 101 also includes a mailer 121 and a Web server 122, and can perform transmission/reception of mail and transmit a file, data, and the like to the terminal device 300. Moreover, the control unit 101 performs file transmission and a file operation. The RAM 103 is a work area when a program is executed in the whole control unit 101.

<Process of MFP 100>

Figure 6:
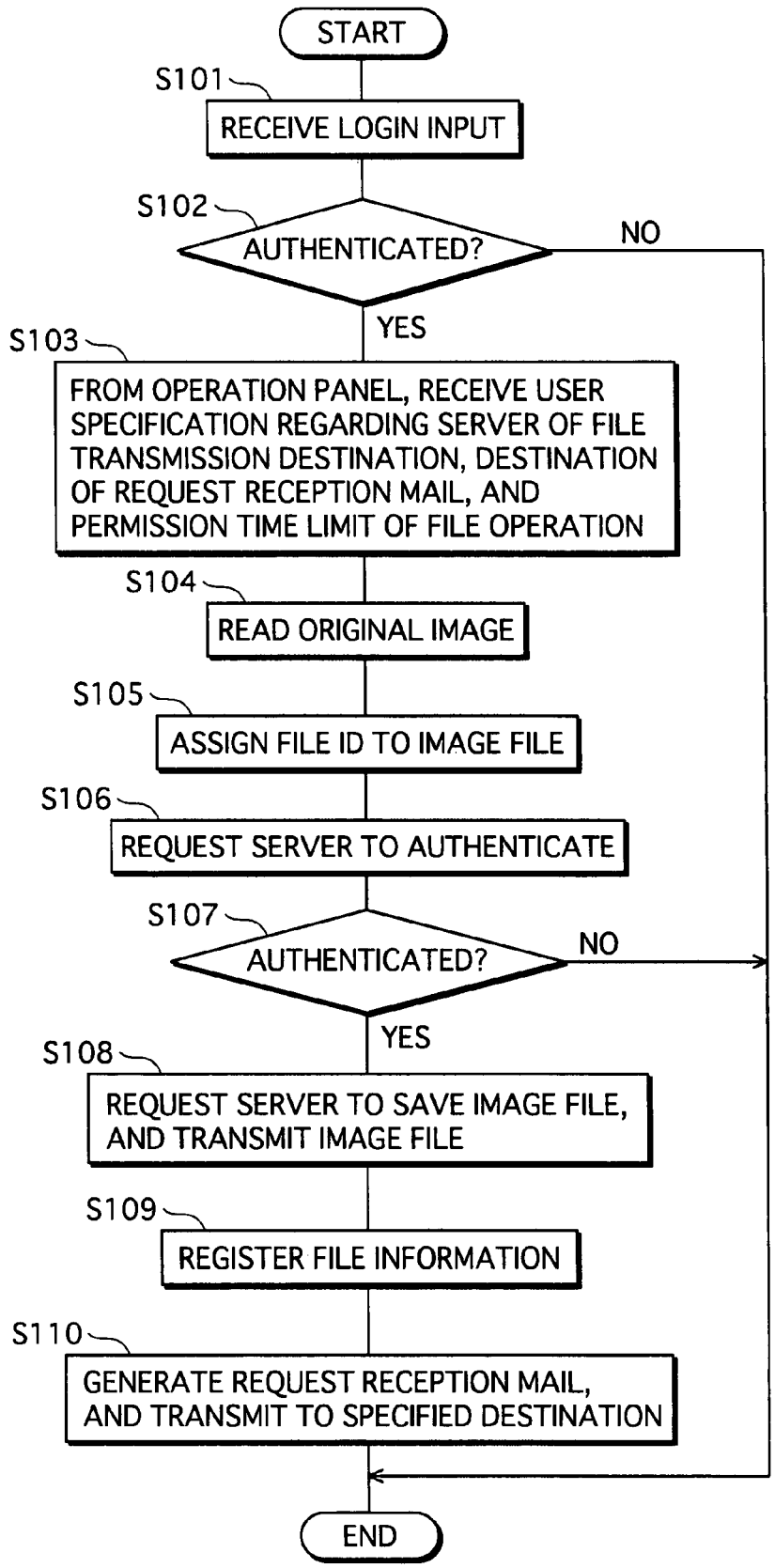
FIG. 6 is a flowchart showing a file transmission process performed by the MFP.

FIG. 6 is a flowchart showing a file transmission process performed by the MFP 100. This process is performed when a user presses a file transmission key on the operation panel 106 and an execution instruction of file transmission is received.

As shown in FIG. 6, firstly, the MFP 100 receives a login input from a user (step S101). Specifically, in a screen (not illustrated) for authenticating a user displayed on the operation panel 106, an input of a user name and a password of from a user is received.

The MFP 100 authenticates the user (step S102). The MFP 100 identifies the user (operator) based on the inputted ID and the password, and judges whether the identified user is a permitted user to determine whether the identified user is authenticated as authorized. Specifically, when judging that an inputted user ID and a password are identical to any pair of an ID and a password included in the user information 1111 registered in the user information holding unit 110, the MFP 100 authenticates the user as a permitted user. When judging that an inputted user ID and a password are not identical to any pair, the MFP 100 judges the user as a non-permitted user and does not authenticate the user as authorized.

When judging that the user is authenticated as authorized ("YES" in step S102), the MFP 100 causes the operation panel 106 to display a file transmission reception screen (not illustrated), and receives a user specification regarding a server which is a save destination of an image file, a destination of request reception mail 1211, and a permission time limit of an image file operation (step S103). Note that as a specification method of a server of a save destination, the following method may be used. The MFP 100 causes the file transmission reception screen to display a list of selectable server names. When a user touch-inputs any of the server display portions, the inputted server is recognized to be specified by the user. Also, as a specification method of a destination of request reception mail, a destination may be selected from a destination group which has been registered in advance, or an address may be inputted by a numeric keypad.

When receiving a user specification, the MFP 100 reads a set original image (step S104). The MFP 100 encrypts the read image information to generate an image file, and assigns a unique file ID to the image file (step S105). Note that a decryption key corresponding to an encryption key used for the encryption is generated. This decryption key is written to the file information holding unit 108 when file information is registered which will be described later (step S109).

Then, the MFP 100 requests the specified server (hereinafter, referred to as "server 200") to perform authentication (step S106). Specifically, the MFP 100 reads an account name and a password for the server 200 as login information for a server by referring to the server information 1091 held by the server information holding unit 109, and transmits the account name and the password to the server 200 to request to perform authentication.

If being authenticated as authorized (permitted to access) by the server 200 ("YES" in step S107), the MFP 100 requests the server 200 to save the image file, and transmits the image file to the server 200 (step S108). With this operation, the image file is saved in the server 200. Therefore, the whole control unit 101 functions as an accessing unit to access a server by requesting to permit access, and a transmitting unit to transmit an image file to a server in order to save the image file in the server, when the whole control unit 101 performs the processes such as steps S106 to S108.

A save destination of an image file in the server 200 may be a directory for storing a preliminary determined image file, or a new directory may be generated for each image file. Also, a save destination may be specified by a user from the operation panel 106. An address of the save destination is a URI of the image file.

The MFP 100 registers file information of the transmitted image file in the file information holding unit 108 (step S109) This file information is specified, read, generated, and the like in the steps S101 to S108.

Then, the MFP 100 generates the request reception mail 1211, and transmits the request reception mail 1211 to a destination (terminal device) specified by a user (step S110). Therefore, the whole control unit 101 functions as a notifying unit to notify the specified destination that a file operation request is received by the MFP 100, when the whole control unit 101 performs the processes such as the steps S103, S110, and the like.

FIG. 7 is a content example of request reception mail.

As shown in FIG. 7, the request reception mail 1211 includes information indicating a destination (To), a transmission source (From), a message subject, an executable file operation content (such as a list of a file operation), and a URL (address of the MFP 100 which receives a file operation request) of a request destination (MFP 100) which is requested to perform a file operation.

In FIG. 7, as an executable file operation content, each item such as "a page of a file operation list", "a browse of a file content", "printing", "file deletion", "making of a print button of a file content on a panel". However, the file operation types are not limited to these.

Note that there may be a case that a file operation type is different according to a user of a destination. More specifically, a file operation type is determined by referring to a functional restriction of the user information 1111. For example, as shown in FIG. 7A, if a user of a destination has no limit, all items are included in a file operation type as selectable items. However, as shown in FIG. 7B, if a user is permitted only to browse, only an item of a browse and a URL for requesting to browse are included in a file operation type. The MFP 100 determines an executable file operation type according to a functional restriction for each user, and writes information indicating the determined type and a corresponding URL to the request reception mail 1211. This construction can manage a file operation type to be permitted for each user.

As a URL parameter, a character string "tf . . . 123" included in a URL is information indicating a file ID, and character strings "ope" and "view" following "tf . . . 123" are file operation information indicating a file operation content.

When transmitting the request reception mail 1211, the MFP 100 ends the file transmission process. Note that if not being authenticated as authorized in the steps S102 and S107, the MFP 100 ends the process. Although an example using mail is described above, a communication method is not limited to this. For example, an instant messenger may be used.

The user using the terminal device causes the terminal device to display the request reception mail 1211, and can select a desired file operation by clicking any of the above-mentioned display portion of a URL. As described later, when the user clicks a display portion of a URL, the terminal device transmits a file operation request including the above-mentioned parameter to a link destination (MFP 100).

Figure 8:
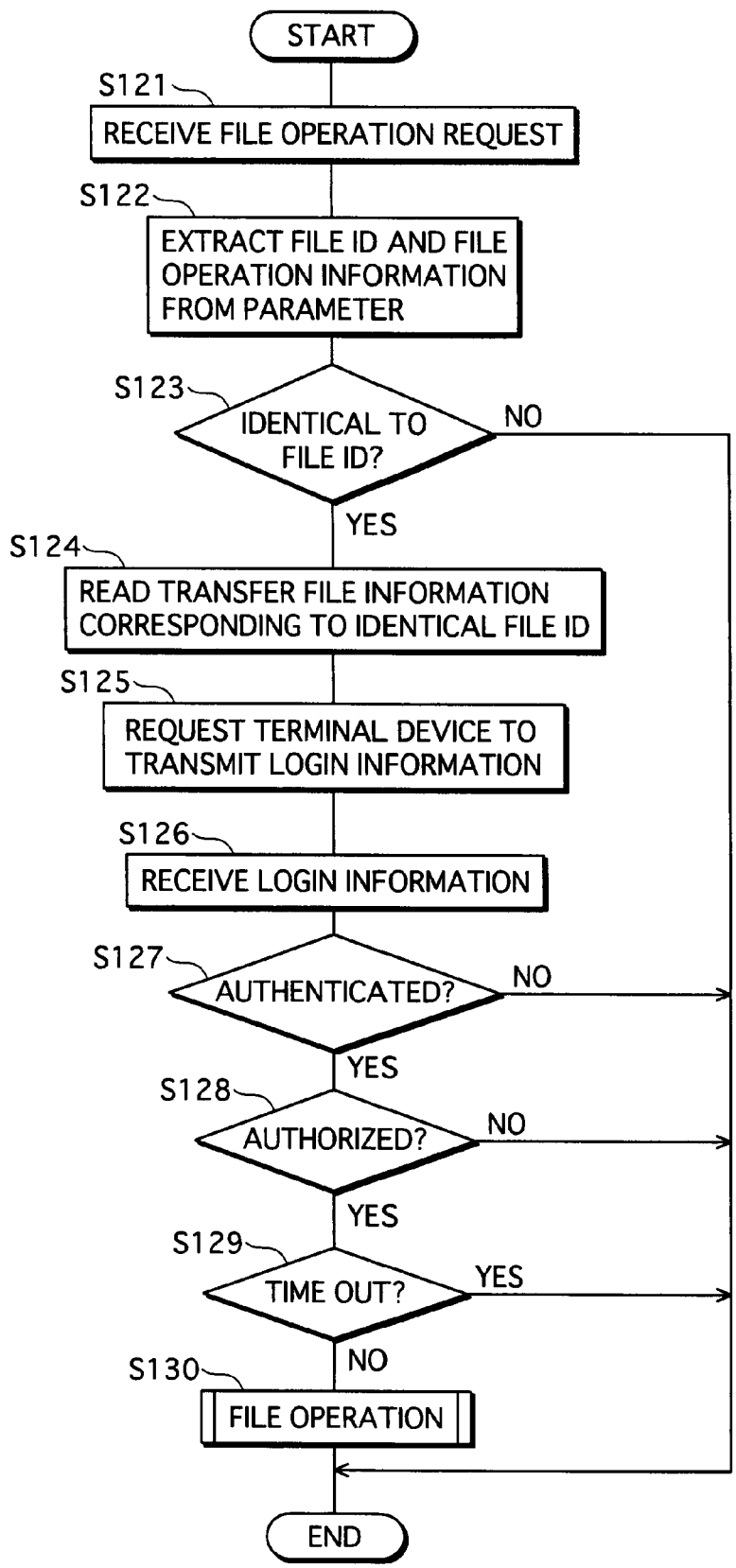
FIG. 8 is a flowchart showing a process performed by the MFP when a file operation request from a terminal device is received.

FIG. 8 is a flowchart showing a process performed by the MFP 100 when a file operation request from the terminal device is received.

As shown in FIG. 8, when receiving a file operation request (step S121), the MFP 100 extracts a file ID and file operation information from a parameter included in the request (step S122). Then, the MFP 100 judges whether the extracted ID is identical to any ID in a file ID column of the file information 1081 of each image file held in the file information holding unit 108 (step S123). When judging that the extracted ID is not identical to any ID in the file ID column ("NO" in step S123), the MFP 100 ends the process. With the above-mentioned construction, whether a file operation is permitted to a user can be judged for each user who requests a file operation. Therefore, security for an image file can be more improved. In this case, the user of the terminal device may be notified of a message indicating that a request is not executed, and a reason thereof (there is no identical ID, here). This notification may be performed when the MFP 100 ends the process in midstream in steps S127 to S129 which will be described later.

When judging that the extracted ID is identical to any ID in the file ID column ("YES" in step S123), the MFP 100 reads (obtains) file information (each information other than the file ID such as a URI of an image file, a permission time limit, and the like) corresponding to the file ID (step S124).

The MFP 100 requests the terminal device to transmit a user name and a password of the user as login information (step S125). In the terminal device, a login information input screen (refer to FIG. 15) is displayed as described later. When login information is inputted by the user, the login information is transmitted to the MFP 100.

When receiving the login information from the terminal device (step S126), the MFP 100 performs user authentication based on the received login information (step S127). This authentication is performed by the same method as in the step S102. Also, the authentication may be performed if "a user name and a password" included in the received login information are identical to "a user name and a password of a user performing file transmission" included in the read file information, i.e. if a user (transmission source) performing file transmission from the MFP 100 to the server 200 is identical to a user (request source) requesting a file operation from the terminal device. With the above-mentioned construction, authentication is performed only when a transmission source and a request source are one and the same. Therefore, other person can be excluded.

When judging that the user is not authenticated as authorized ("NO" in step S127), the MFP 100 ends the process. When judging that the user is authenticated as authorized ("YES" in step S127), the MFP 100 judges whether the authenticated user has an authority (is permitted) to perform a requested file operation (step S128). This judgment is performed based on whether a file operation requested by the user is an operation which is not functionally restricted to the user, by referring to a functional restriction of the user information 1111. For example, when a functional restriction of the user is "no restriction", the user is judged to have the authority. If printing is requested from the user though an executable file operation of the user is restricted to "only a browse", the user is judge to have no authority. When judging that the user has no authority ("NO" in step S128), the MFP 100 ends the process.

When judging that the user has an authority ("YES" in step S128), the process moves to step S129. In step S129, whether a file operation is a time-out is judged. This judgment is performed by judging whether current date and time exceeds a time limit indicated by a permission time limit of a file operation of the read file information. When judging that the file operation is a time-out, i.e. current date and time exceeds a permission time limit of a file operation ("YES" in step S129), the MFP 100 ends the process. When judging that current date and time does not exceed a permission time limit of a file operation ("NO" in step S129), the process moves to a file operation process (step S130). This can manage whether a file operation of an image file is permitted based on a time.

Figure 9:
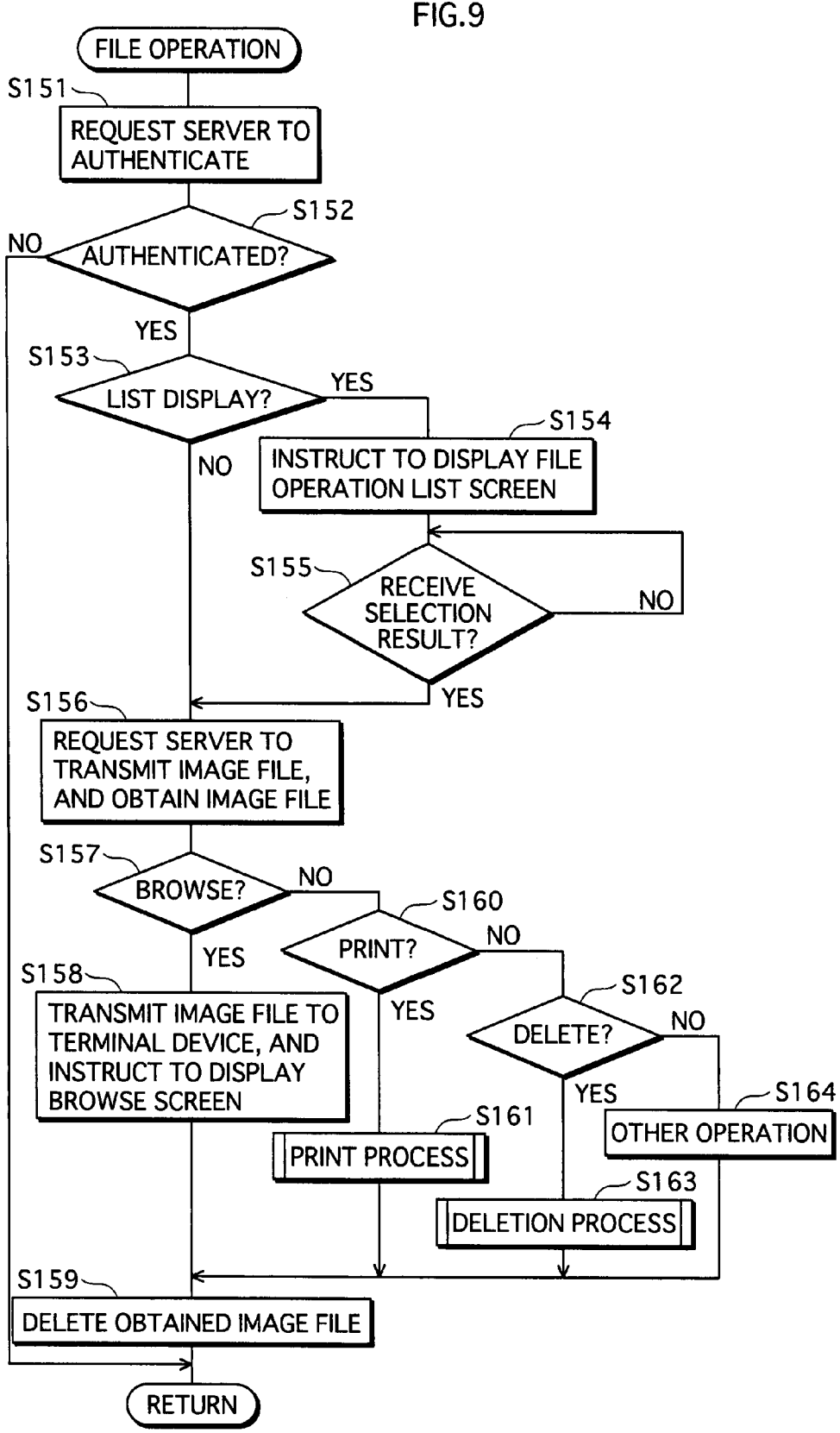
FIG. 9 is a flowchart showing a content of a file operation process subroutine.

FIG. 9 is a flowchart showing a content of a file operation process subroutine.

As shown in FIG. 9, the MFP 100 requests the server 200 to perform authentication (step S151). When being authenticated as authorized ("YES" in step S152), the MFP 100 judges whether a file operation selected by the user of the terminal device is a list display of a file operation (step S153). When judging that the selected file operation is the list display ("YES" in step S153), the MFP 100 instructs the terminal device to display a list screen (refer to FIG. 16) indicating an executable file operation content (step S154). More specifically, the MFP 100 specifies an executable file operation according to a functional restriction for each user, generates screen information for displaying the specified file operation content, and transmits the screen information to the terminal device. Then, the MFP 100 causes the terminal device to display a list screen based on the screen information. The same method can be applied when instructing to display other screen. Note that the method is not limited to this, and other method may be used as long as the MFP 100 can instructs the terminal device to display a screen.

As described later, the terminal device receives a file operation selection from a user in a list screen, and transmits a result of the selection to the MFP 100.

When receiving the result of the selection from the terminal device ("YES" in step S155), the process moves to step S156. Note that when judging that the file operation selected by the user is not a list of a file operation ("NO" in step S153), the process moves to step S156.

In step S156, the MFP 100 requests the server 200 to transmit an image file corresponding to a file ID requested by the user, and obtains the image file from the server 200. The obtained image file is decrypted by a decryption key included in file information.

In step S157, the MFP 100 judges whether a file operation selected by the user is a browse of a file. When judging that the file operation is a browse of a file ("YES" in step S157), the MFP 100 transmits the above-mentioned image file to the terminal device, instructs the terminal device to display a browse screen (refer to FIG. 17) for a browse (step S158), and causes the terminal device to display a browse screen. Then, the process returns to a main routine after the MFP 100 deletes the image file from the MFP 100 (step S159). Therefore, when the processes such as the steps S121 to S130 are performed, the whole control unit 101 functions as a file operating unit to perform a requested file operation on an image file saved in the server if a file operation request is received.

When judging that a file operation selected by the user is printing ("NO" in step S157, "YES" in step S160), the MFP 100 performs a printing process (step S161).

Figure 10:
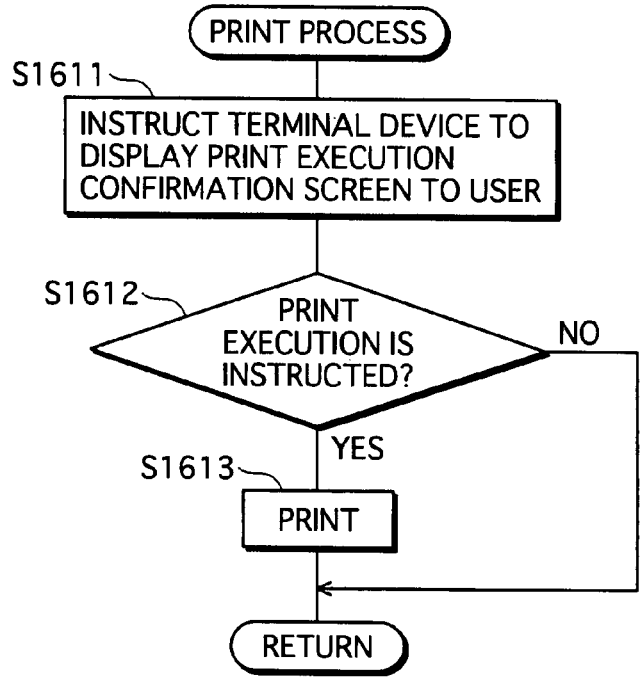
FIG. 10 is a flowchart showing a content of a print process subroutine.

FIG. 10 is a flowchart showing a content of a print process subroutine.

As shown in FIG. 10, the MFP 100 transmits the above-mentioned image file to the terminal device, and instructs the terminal device to display a print confirmation screen (refer to FIG. 18) for the user to confirm that the image will be printed (step S1611). As described later, the terminal device receives an instruction to perform printing or not to perform printing from a user, and transmits a result of the instruction to the MFP 100.

When receiving an instruction to perform printing from the terminal device ("YES" in step S1612), the MFP 100 performs printing of the above-mentioned image file (step S1613), and the process returns to a subroutine of a file operation process. On the other hand, when receiving an instruction not to perform printing ("NO" in step S1612), the process returns to the subroutine of the file operation process without performing printing. When the printing process (step S161) ends, the process moves to step S159.

When judging that a file operation selected by the user is file deletion ("NO" in step S160, "YES" in step S162), the MFP 100 perform a deletion process (step S163).

Figure 11:
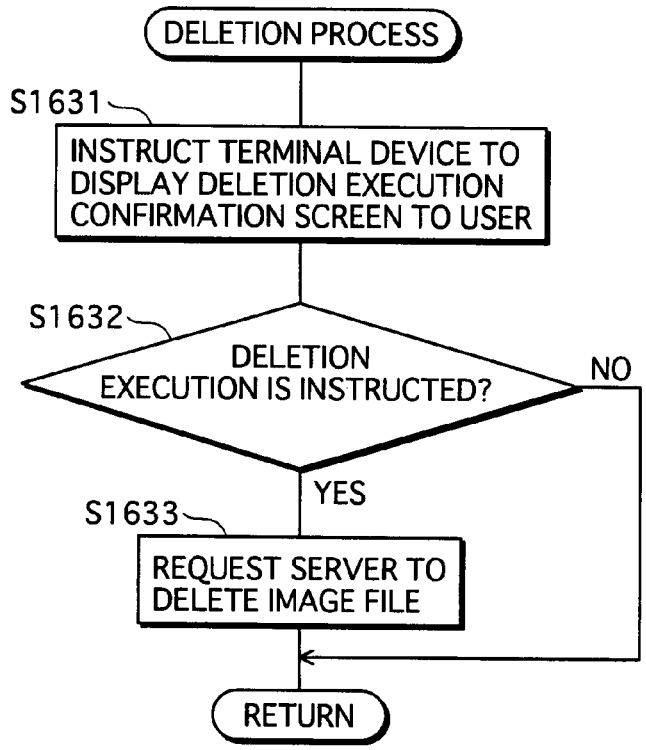
FIG. 11 is a flowchart showing a content of a deletion process subroutine.

FIG. 11 is a flowchart showing a content of a deletion process subroutine.

As shown in FIG. 11, the MFP 100 transmits the above-mentioned image file to the terminal device, and instructs the terminal device to display a delete confirmation screen (refer to FIG. 19) for the user to confirm that the image will be deleted (step S1631). As described later, the terminal device receives an instruction to perform deletion or not to perform deletion from a user, and transmits a result of the instruction to the MFP 100.

When receiving an instruction to perform deletion from the terminal device ("YES" in step S1632), the MFP 100 requests the server 200 to perform authentication. After being authenticated as authorized, the MFP 100 requests the server 200 to delete an image file corresponding to a deletion target file ID, and causes the server 200 to delete the image file (step S1633). Then, the process returns to a subroutine of a file operation process. On the other hand, when receiving an instruction not to perform deletion ("NO" in step S1632), the process returns to the subroutine of the file operation process without requesting the server 200 to delete. When the deletion process (step S163) ends, the process moves to step S159.

When a file operation selected by the user is an operation other than a list display, a browse, printing, and deletion ("NO" in step S162), the MFP 100 performs the process of the file operation (step S164), and the process moves to step S159.

Figure 12:
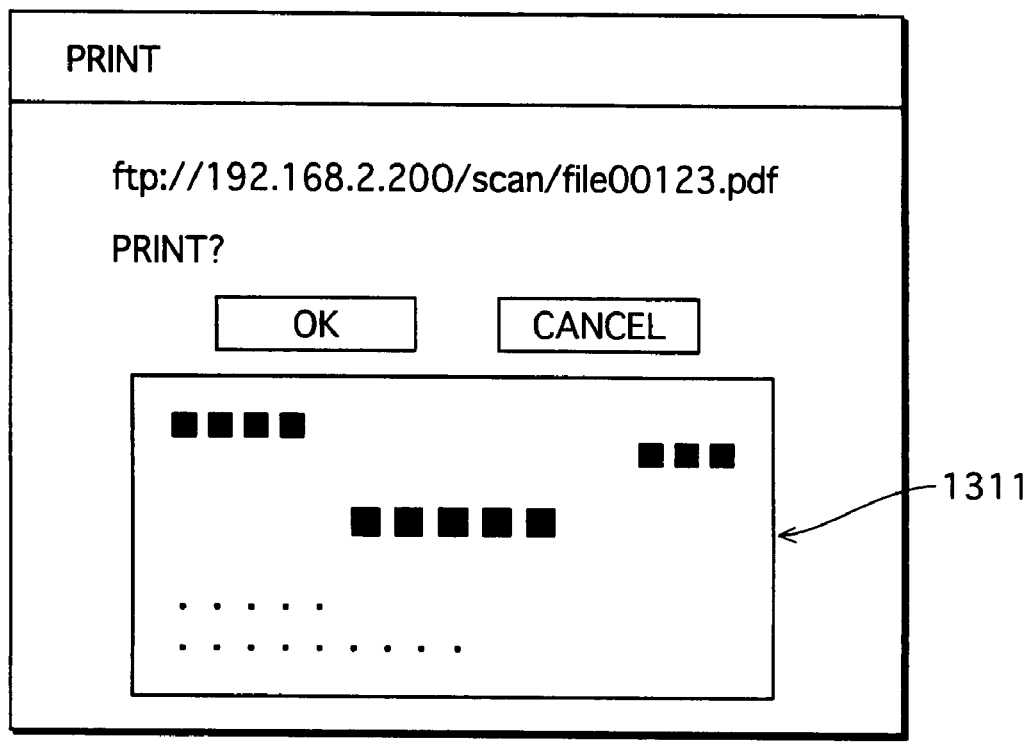
FIG. 12 shows an example of a print confirmation screen displayed in a liquid crystal display unit of the MFP.

When the operation is "making of a print button of a file content on a panel", the following process is performed. In other words, the MFP 100 causes the operation panel 106 to display a login screen in a liquid crystal display unit. When the user logs into the login screen, the MFP 100 causes the operation panel 106 to display a print confirmation screen 131 shown in FIG. 12. In the print confirmation screen 131, an image 1311 of a print target (corresponding to an image of an image file obtained by the MFP 100 from the server 200) is displayed as a reference. The user can visually confirm the image 1311 by the print confirmation screen 131. When the user would like to perform printing, the selection can be performed by clicking an OK button. On the other hand, when the user would not like to perform printing, the selection can be performed by clicking a cancel button.

When performing printing is selected, the MFP 100 prints the image on a sheet by controlling the printing unit 104.

As mentioned above, the MFP 100 has the construction in which a button for printing is made on the operation panel 106, and printing starts after the button is pressed. This construction can reduce a chance that an output image is seen by other people. In other words, when the user instructs to perform printing from the terminal device, the following case may happen. If a print output has completed in the MFP 100 while the user moves from the terminal device to a location of the MFP 100, the user has a chance that an output image is seen by other people. However, according to the above-mentioned construction, the user moves to a location of the MFP 100, and then, instructs to perform printing from the operation panel 106 of the MFP 100. As a result, an output image is unlikely to be seen by other people.

A button made on the operation panel 106 is not limited to the above-mentioned print button, and a button for other file operation may be made. The user can directly instructs to perform a file operation in the MFP 100 instead of from the terminal device.

<Process of Terminal Device>

Figure 13:
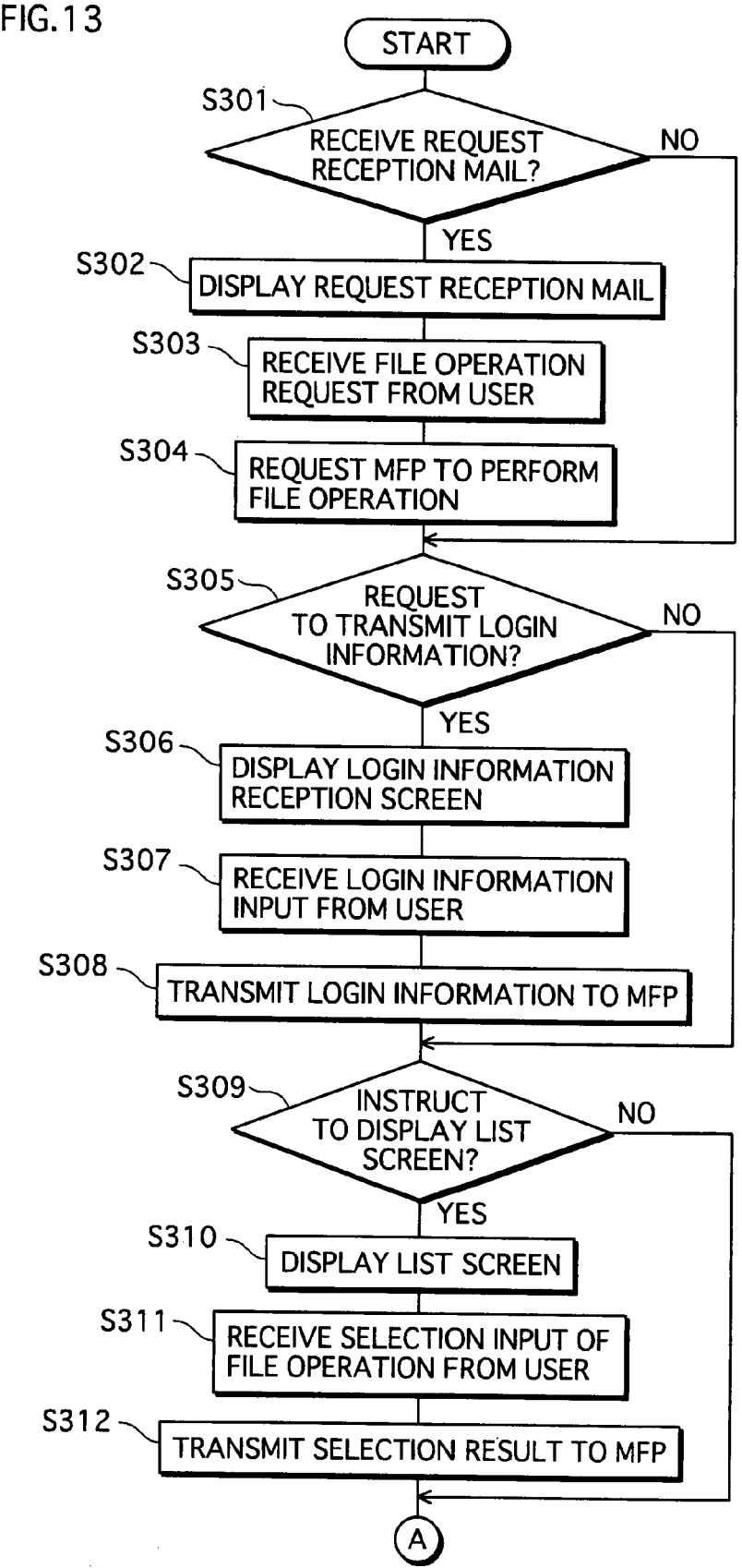
FIG. 13 is a flowchart showing a process performed by the terminal device.

FIG. 13 is a flowchart showing a process performed by the terminal device. The process is performed when the process subroutine is called in other main routine which is not illustrated.

As shown in FIG. 13, the terminal device judges whether the request reception mail 1211 is received from the MFP 100 (step S301). When judging that the request reception mail 1211 is received ("YES" in step S301), the terminal device causes a screen of the display 302 to display the request reception mail 1211 by an instruction from the user (step S302). Then, a content of the request reception mail 1211 is displayed on a screen as shown in FIG. 7. When the user clicks a display portion of a URL on a display screen, the terminal device recognizes that the user requests a file operation, and receives the request (step S303). Then, the terminal device transmits the request of the file operation to a link destination (MFP 100) (step S304), and the process moves to step S305. This request is received in the process of the step S121.

In step S305, the terminal device judges whether the MFP 100 requests to transmit login information. This transmission request is requested in the process of the step S125 in the MFP 100. When judging that the MFP 100 requests to transmit login information ("YES" in step S305), the terminal device causes the display 302 to display a login information reception screen (step S306).

FIG. 15 shows a display example of a login information reception screen 311.

As shown in FIG. 15, in the login information reception screen 311, input columns of a user name and a password are provided. The user can input information for identifying the user, and a password (for authentication by the MFP 100) as login information by the keyboard 303 and the like.

Back to FIG. 13, when receiving an input of login information from the user (step S307), the terminal device transmits the received login information to the MFP 100 (step S308), and the process moves to step S309. This login information is received in the process of the step S126 in the MFP 100.

In step S309, the terminal device judges whether the MFP 100 instructs to display a list screen. This instruction is instructed in the process of the step S154 in the MFP 100. When judging that the MFP 100 instructs to display a list screen ("YES" in step S309), the terminal device causes the display 302 to display a list screen based on the instruction (step S310).

FIG. 16 shows a display example of a list screen 312.

As shown in FIG. 16, in the list screen 312, each button indicating an executable file operation item is displayed. FIG. 16 shows the example in which each button indicating a browse, printing, and deletion is displayed. The user can select a desired file operation by clicking a button indicating the desired file operation. Note that a file operation item may change according to a functional restriction for each user as mentioned above. For example, in the list screen 312 to a user who is permitted only to browse, only a button for a browse is displayed.

Figure 14:
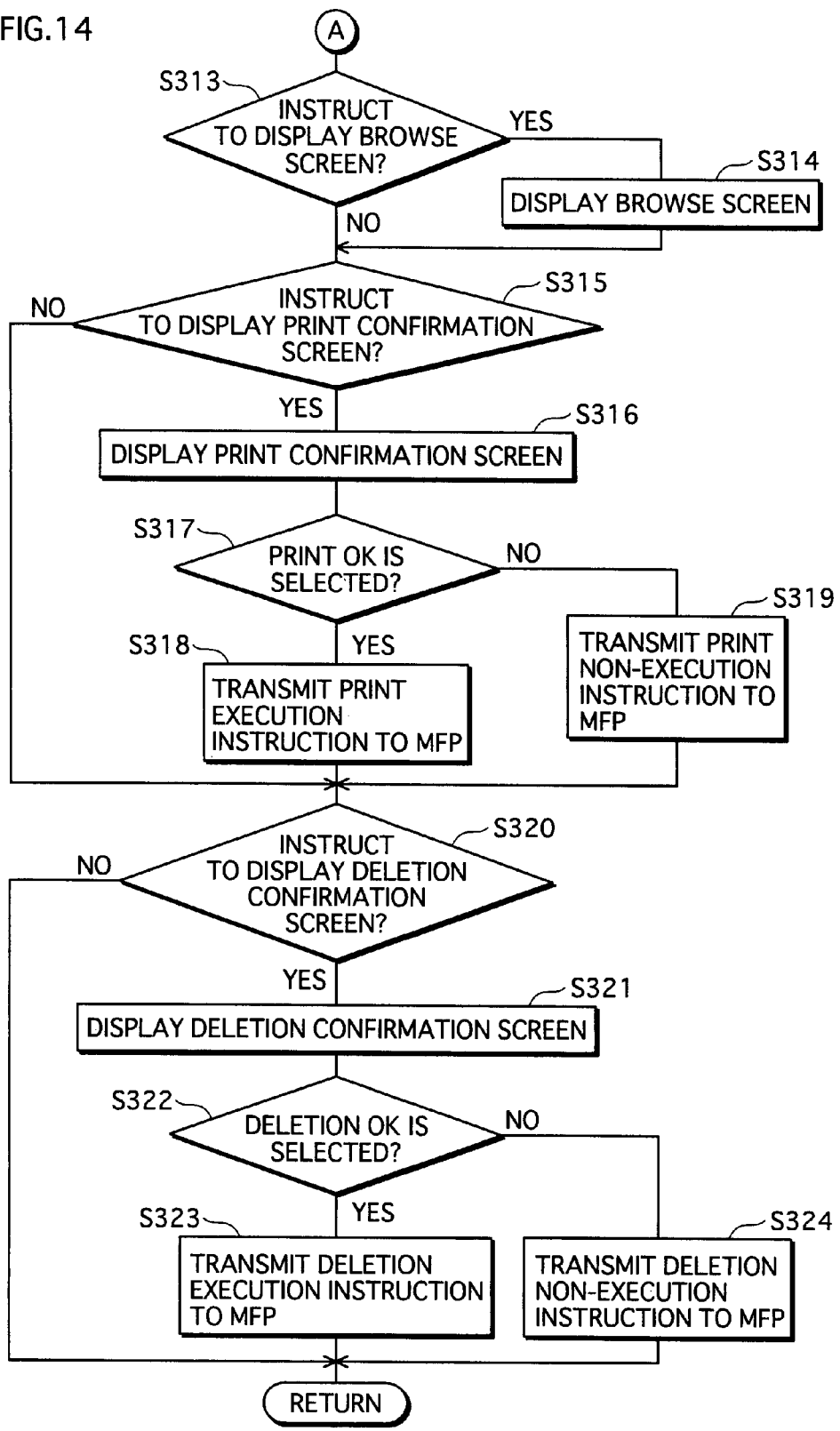
FIG. 14 is a flowchart showing a process performed by the terminal device.

Back to FIG. 13, when receiving a selection input of a file operation from the user (step S311), the terminal device transmits the received selection result to the MFP 100 (step S312), and the process moves to step S313 shown in FIG. 14. This selection result is received in the process of step S155 in the MFP 100.

In step S313, the terminal device judges whether the MFP 100 instructs to display a browse screen. This instruction is instructed in the process of the step S158 in the MFP 100. When judging that the MFP 100 instructs to display a browse screen ("YES" in step S313), the terminal device causes the display 302 to display a browse screen based on the instruction (step S314).

Figure 17:
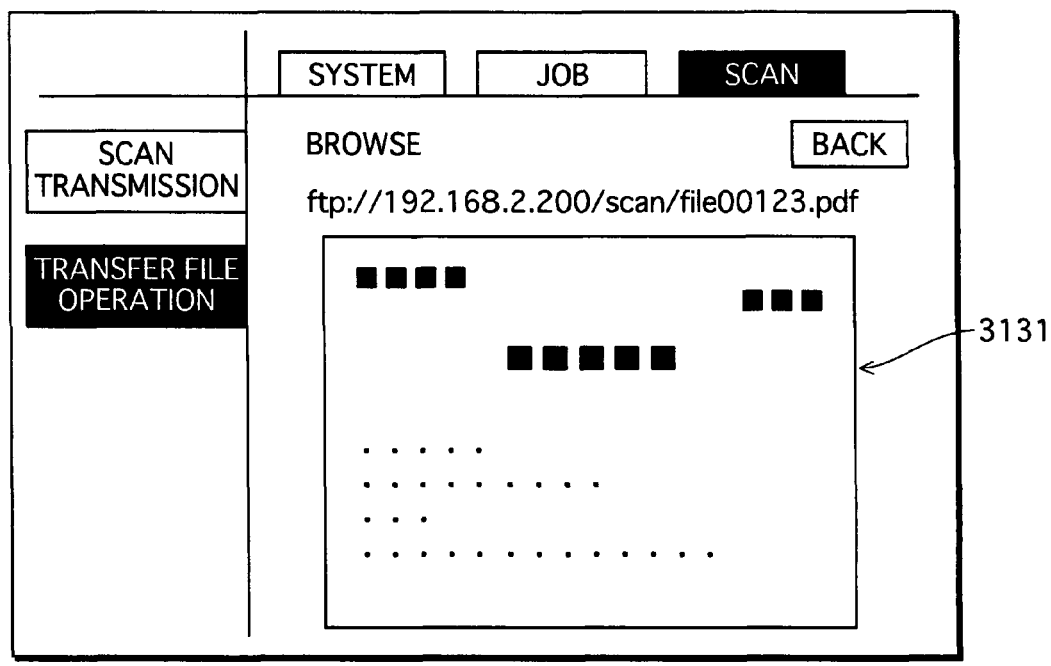
FIG. 17 shows a display example of a browse screen displayed in the display of the terminal device.

FIG. 17 shows a display example of a browse screen 313. In the browse screen 313, an image 3131 of an image file, which is transmitted from the MFP 100 when the MFP 100 instructs to display, is displayed as a reference. The user can visually confirm the image 3131 by the browse screen 313. When the user instructs to close the browse screen 313, the terminal device closes the browse screen 313, and the process moves to step S315.

In step S315, the terminal device judges whether the MFP 100 instructs to display a print confirmation screen. This instruction is instructed in the process of the step S1611 in the MFP 100. When judging that the MFP 100 instructs to display a print confirmation screen ("YES" in step S315), the terminal device causes the display 302 to display a print confirmation screen based on the instruction (step S316).

Figure 18:
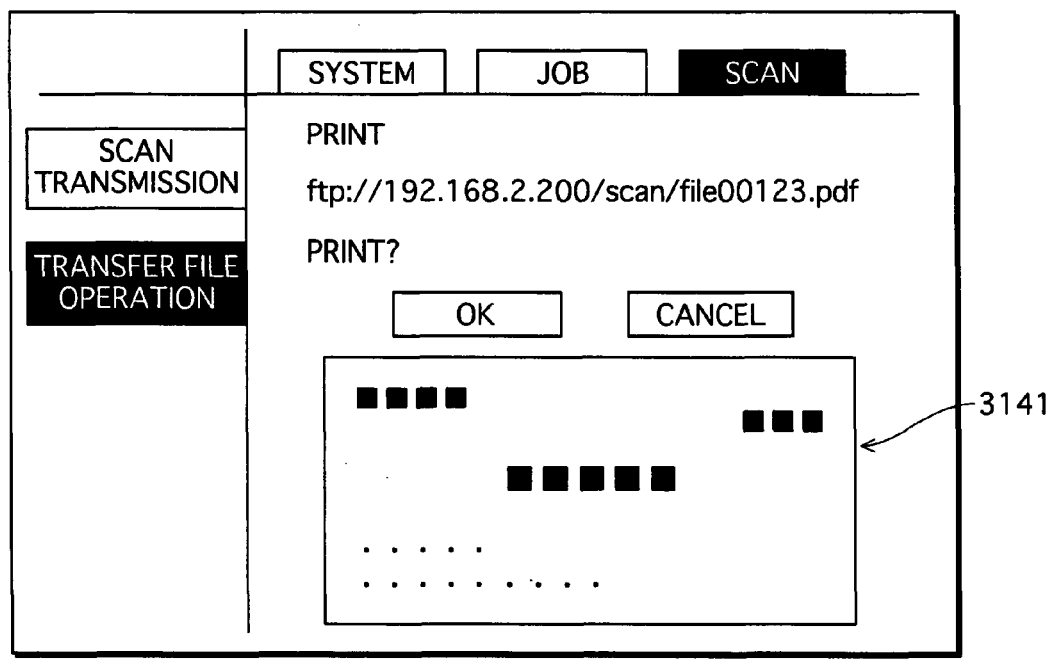
FIG. 18 shows a display example of a print confirmation screen displayed in the display of the terminal device.

FIG. 18 shows a display example of a print confirmation screen 314.

As shown in FIG. 18, the print confirmation screen 314 has about the same construction as the print confirmation screen 131. In the print confirmation screen 314, an image 3141 of an image file, which is transmitted from the MFP 100 when the MFP 100 instructs to display, is displayed as a reference. The user can visually confirm the image 3141 by the print confirmation screen 314. When the user would like to perform printing, the selection can be performed by clicking an OK button. On the other hand, when the user would not like to perform printing, the selection can be performed by clicking a cancel button.

Back to FIG. 14, when judging that the user selects to perform printing ("YES" in step S317), the terminal device transmits an instruction to perform printing to the MFP 100 (step S318), and the process moves to step S320. On the other hand, when judging that the user selects not to perform printing ("NO" in step S317), the terminal device transmits an instruction not to perform printing to the MFP 100 (step S319), and the process moves to step S320. Each of these instructions is received in the process of the step S1612 in the MFP 100.

In step S320, the terminal device judges whether the MFP 100 instructs to display a deletion confirmation screen. This instruction is instructed in the process of the step S1631 in the MFP 100.

When judging that the MFP 100 instructs to display a deletion confirmation screen ("YES" in step S320), the terminal device causes the display 302 to display a deletion confirmation screen based on the instruction (step S321).

Figure 19:
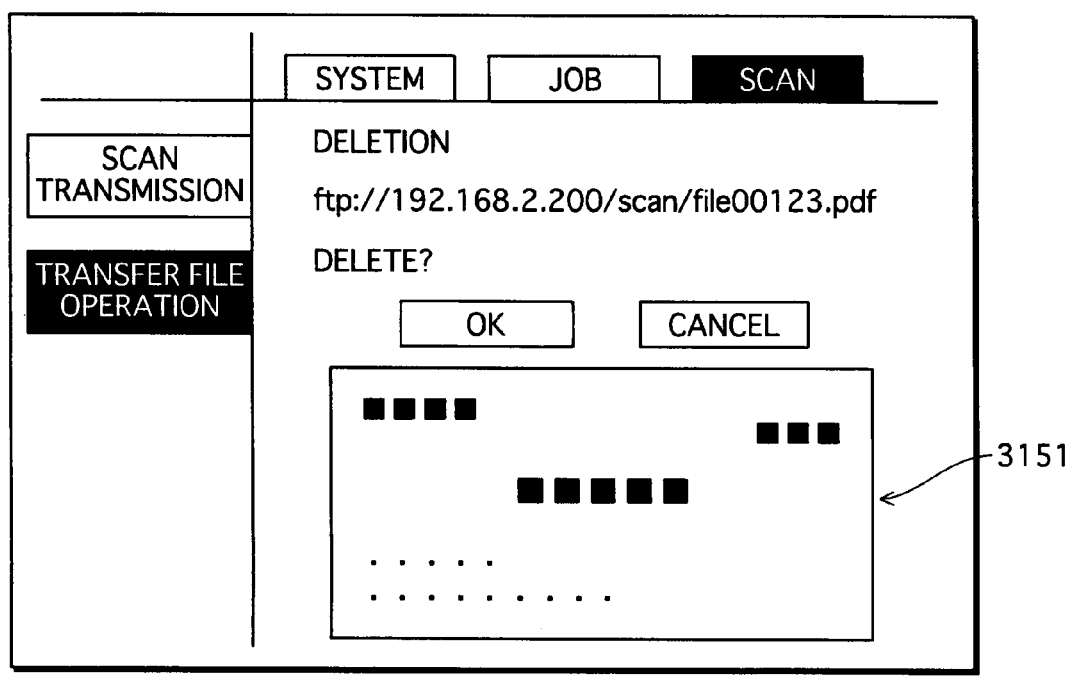
FIG. 19 shows a display example of a deletion confirmation screen displayed in the display of the terminal device.

FIG. 19 shows a display example of a deletion confirmation screen 315.

As shown in FIG. 19, in the deletion confirmation screen 315, an image 3151 of an image file, which is transmitted from the MFP 100 when the MFP 100 instructs to display, is displayed as a reference. The user can visually confirm the image 3151 by the deletion confirmation screen 315. When the user would like to perform deletion, the selection can be performed by clicking an OK button. On the other hand, when the user would not like to perform printing, the selection can be performed by clicking a cancel button. This enables the user to instructs the MFP 100 from the terminal device to delete an image file saved in the server 200.

Back to FIG. 14, when judging that the user selects to perform deletion ("YES" in step S322), the terminal device transmits an instruction to perform deletion to the MFP 100 (step S323), and the process returns to a main routine. On the other hand, when judging that the user selects not to perform deletion ("NO" in step S322), the terminal device transmits an instruction not to perform deletion to the MFP 100 (step S324), and the process returns to a main routine. Each of these instructions is received in the process of the step S1632 in the MFP 100.

<Process of Server 200>

FIG. 20 is a flowchart showing a process performed by the server 200. The process is performed when the process subroutine is called in other main routine which is not illustrated.

As shown in FIG. 20, the server 200 judges whether an authentication request is received from an external device such as the MFP 100 (step S201). This authentication request is requested in the process of the step S106 in the MFP 100.

When judging that an authentication request is received ("YES" in step S201), the server 200 performs authentication based on login information transmitted from a request source (step S202). More specifically, the server 200 refers to an account name and a password for the server 200 included in the received login information, and judges whether the account name and the password are identical to an account name and a password for authentication which have been registered in advance. When judging that the request source is authenticated as authorized ("YES" in step S203), the server 200 transmits the result that the request source is authenticated as authorized to the request source (MFP 100) (step S204), and the process moves to step S205. On the other hand, when judging that the request source is not authenticated as authorized ("NO" in step S203), the server 200 transmits the result that the request source is not authenticated as authorized to the request source (step S212), and the process returns to a main routine. This authentication result is received in the process of the step S107 in the MFP 100.

In step S205, the server 200 judges whether a request regarding an image file is received from an authenticated device (MFP 100). When judging that a request is received ("YES" in step S205), the server 200 judges whether the received request is a save request of an image file (step S206). This save request is requested in the process of the step S108 in the MFP 100. When judging that the received request is a save request ("YES" in step S206), the server 200 saves an image file transmitted from the MFP 100 (step S207), and the process moves to step S208. On the other hand, when judging that the received request is not a save request ("NO" in step S206), the process moves to step S208.

In step S208, the server 200 judges whether the received request is a transmission request of an image file. This request is requested in the process of the step S156 in the MFP 100. When judging that the received request is a transmission request of an image file ("YES" in step S208), the server 200 reads an image file corresponding to a requested file ID, transmits the image file to the MFP 100 (step S209), and the process moves to step S210. On the other hand, when judging that the received request is not a transmission request of an image file ("NO" in step S208), the process moves to step S210.

In step S210, the server 200 judges whether a received request is a deletion request of an image file. This request is requested in the process of the step S1633 in the MFP 100. When judging that a received request is a deletion request of an image file ("YES" in step S210), the server 200 deletes an image file corresponding to a requested file ID (step S211), and the process returns to a main routine. On the other hand, when judging that the received request is not a deletion request of an image file ("NO" in step S210), the, process returns to a main routine. Note that when judging that an authentication request is not received ("NO" in step S201), the process returns to a main routine.

In the above-mentioned embodiment, the example in which a file operation such as a browse and printing is performed on one image file is described. However, the same file operation is performed if a plurality of image files are read. In this case, the request reception mail 1211 may be separately generated for each image. Also, file IDs, file operation contents and URLs for receiving the request of a plurality of image files may be written in one request reception mail 1211. Moreover a plurality of image file may be set as one group, and a request of a browse, printing, and the like of an image file which belongs to the group may be received for each group. In this case, a first image may be displayed on the browse screen 313 as a reference image, or a thumbnail image may be displayed by reducing a plurality of images.

The present invention is not limited to an image processing system and an image processing apparatus, and may be a file operation method of an image file such as a browse, or a program that causes a computer to execute the file operation method. The program achieving the present invention may be recorded on various computer-readable recording mediums such as: magnetic tape; a magnetic disk such as a flexible disk; an optical recording medium such as a DVD-ROM, a DVD-RAM, a CD-ROM, CD-R, MO, or PD; and a flash-memory-type recording medium. The present invention may be produced or transferred in the form of the above-mentioned recording medium, or may be sent or supplied in the form of the above-mentioned program via: one of various wired/wireless networks including the Internet; a broadcast; an electric communication line; a satellite communication or the like.

It is not necessary for the above-mentioned program to include all the modules for the above-described processes to be executed by the computer. For example, part of the processes of the present invention to be executed by the computer may be achieved by general-purpose programs that can be installed in an information processing device, such as the programs contained in a communication program or an operating system (OS). Accordingly, the recording medium of the present invention does not necessarily record all the above-mentioned modules, nor is it necessary to send all the modules. Furthermore, predetermined processes of the present invention may be executed using dedicated hardware.

<Modifications>

Up to now, the image processing apparatus, the image processing system, and the image processing method of the present invention have been described specifically through the embodiment. However, the technical scope of the present invention is not limited to the above-described embodiment. For example, the following are modifications.

(1) In the above-mentioned embodiment, a browse, printing, and the like of a file as a file operation are written to the request reception mail 1211. However, the following construction may be applied. If a file operation cannot be used, a content of the file operation is not written. For example, if the printing unit 104 cannot be used because of a trouble and the like, "print" is not displayed in a selectable file operation group shown in FIG. 21. This is because there is a case in which printing cannot be performed even if a print request is received from a user who receives the request reception mail 1211 in a sate in which printing cannot be performed. With this construction, only an executable operation can be notified, and operability for a user of a notification destination can be more improved.

(2) In the above-mentioned embodiment, a reference image is displayed in the print confirmation screen 314 and the deletion confirmation screen 315. However, the construction is not limited to this, and the following construction in which an image is not displayed when the image can be specified by a file name may be applied. In this case, a display of the print confirmation screen 314 in the terminal device 300 (steps S315 to S319), and a display instruction of the print confirmation screen 314 in the MFP 100 (steps S1611 and S1612) can be omitted. Therefore, the processes can be simplified.

(3) In the above-mentioned embodiment, user authentication is required when the terminal device 300 accesses the MFP 100. However, an authentication method is not limited to the above-mentioned method. Also, a construction in which the authentication is not performed may be applied. Moreover, a user identification method is not limited to the above-mentioned method in which a password is used. For example, necessity of user authentication may be switched for each image file. This can be realized by holding information of an image file and necessity of user authentication in correspondence with each other, and referring to the information.

Furthermore, the following construction may be applied. In other words, a user having an authority to perform a file operation of an image file is responsive to the image file, and a file operation is performed only when a user having the authority requests to perform a file operation. In this case, the MFP 100 holds authority information in which an image file, a user name and a password of a user who is permitted to perform a file operation in correspondence with each other. Then, a user name and a password of login information transmitted from the terminal device 300 are compared with a user name and a password indicated by authority information for an image file of a file operation target to identify each user. When both of these are identical to each other, it is judged that a user having an authority to perform the file operation requests a file operation.

(4) In the above-mentioned embodiment, the image processing apparatus of the present invention is applied to a MFP. However, the present invention is not limited to this, and may be applied to an image processing apparatus having a function of obtaining an image file by reading an original image, such as a scanner, a copier, a facsimile machine. Also, in the above-mentioned embodiment, a touch-panel type liquid crystal display unit is used as a display input unit. However, the display input unit is not limited to this, and a unit for displaying a necessary screen, and receiving an input from a user may be used. Furthermore, in the above-mentioned embodiment, the system construction example in which a plurality of terminal devices 300 are connected is described. However, a construction in which there is one terminal device 300 may be applied. Moreover, the construction is not limited to the network-connected construction, and a construction which is connected by an exclusive line may be applied.

Also, the above-mentioned embodiment may be combined with each of the above-mentioned modifications.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus which is connected to a server and permitted to make an access request to the server, the server receiving the access request only from a request source which is permitted to make the access request, the image processing apparatus comprising:
   a processor;
   a reader operable to read an image to obtain an image file;
   a transmitter operable to access the server and transmit the image file to the server to save the image file in the server;
   a notifier operable to notify a specified destination that a file operation request for the image file saved in the server is to be received by the image processing apparatus; and
   a file operating part operable to, when the file operation request based on the notification is received from the specified destination, access the server and perform a requested file operation on one of the image file saved in the server and the image file obtained as a result of accessing the server.

2. The image processing apparatus of claim 1, wherein the notifier makes the notification by transmitting, to the specified destination, information including a file operation type and an address of the image processing apparatus which is to receive the file operation request.

3. The image processing apparatus of claim 2, wherein
   the file operation is any of a plurality of different types of file operations, and
   the notifier includes:
   an identifying part operable to identify a user specifying the destination, and
   the notifier determines, out of the plurality of different types of file operations, a permitted file operation for the user identified by the identifying part, and makes the notification by transmitting, to the specified destination, the information including a type of the determined file operation.

4. The image processing apparatus of claim 3, wherein the information does not include a type of a file operation being inexecutable in the image processing apparatus.

5. The image processing apparatus of claim 1, wherein the file operating part includes:
   an identifying part operable to identify a user making the file operation request from the specified destination; and
   a judging part operable to judge whether the user identified by the identifying part is permitted to perform the file operation, and
   the file operating part accesses the server only when the identified user is judged to be permitted to perform the file operation.

6. The image processing apparatus of claim 5, wherein the judging part judges the identified user to be permitted when the identified user has an authority to access the image processing apparatus.

7. The image processing apparatus of claim 5, wherein the judging part judges the identified user to be permitted when the identified user has an authority to perform the file operation.

8. The image processing apparatus of claim 7, further comprising:
   a restriction information storing part operable to store restriction information indicating, for each user, whether the file operation is restricted, wherein
   the judging part judges whether the identified user has the authority to perform the file operation by referring to the restriction information.

9. The image processing apparatus of claim 5, wherein the judging part judges the identified user to be permitted when a user specifying the destination and the identified user are same.

10. The image processing apparatus of claim 1, wherein the file operating part includes:
    a time information storing part operable to store time information regarding a permission time limit of the file operation of the image file, and
    the file operating part performs the file operation if a time when the file operation request is made is within the permission time limit, and suppresses performing the file operation if the time exceeds the permission time limit.

11. The image processing apparatus of claim 1, wherein when the requested file operation is browsing the image, the file operating part obtains the image file from the server, transmits the image file to the specified destination, and causes a displaying part of a device of the specified destination to display the image.

12. The image processing apparatus of claim 1, further comprising:
    a printer operable to print the image on a sheet, wherein when the requested file operation is printing the image, the file operating part obtains the image file from the server, and causes the printer to print the image of the image file.

13. The image processing apparatus of claim 1, wherein when the requested file operation is deleting the image file, the file operating part instructs the server to delete the image file.

14. The image processing apparatus of claim 1, further comprising:
    a display inputting part, wherein when the requested file operation is displaying a key for receiving an instruction to perform the file operation from a user, the file operating part causes the display inputting part to display the key, and performs the file operation when an input by the key is received from the user.

15. An image processing system in which a server, an image processing apparatus, and a terminal device are connected, the server receiving an access request only from a request source which is permitted to make the access request, the image processing apparatus being permitted to make the access request to the server, and the terminal device being not permitted to access the server, wherein
    the image processing apparatus comprises:
    a reader operable to read an image to obtain an image file;
    a transmitter operable to access the server and transmit the image file to the server to save the image file in the server;
    a notifier operable to notify the terminal device that a file operation request for the image file saved in the server is to be received by the image processing apparatus; and a file operating part operable to, when the file operation request based on the notification is received from the terminal device, access the server and perform a requested file operation on one of the image file saved in the server and the image file obtained as a result of accessing the server, and the terminal device comprises:

a displaying part operable to display the notification;

a receiver operable to receive an instruction of requesting the file operation from a user; and a request transmitter operable to, when the instruction is received, transmit the file operation request to the image processing apparatus based on the notification.

16. An image processing method in an image processing apparatus which is connected to a server and permitted to make an access request to the server, the server receiving the access request only from a request source which is permitted to make the access request, the image processing method comprising:

a reading step of reading an image to obtain an image file;

a transmitting step of accessing the server and transmitting the image file to the server to save the image file in the server;

a notifying step of notifying a specified destination that a file operation request for the image file saved in the server is to be received by the image processing apparatus; and a file operating step of, when the file operation request based on the notification is received from the specified destination, accessing the server and performing a requested file operation on one of the image file saved in the server and the image file obtained as a result of accessing the server.

* * * * *